(12) United States Patent
Midgley

(10) Patent No.: US 7,930,397 B2
(45) Date of Patent: Apr. 19, 2011

(54) REMOTE DYNAMIC CONFIGURATION OF A WEB SERVER TO FACILITATE CAPACITY ON DEMAND

(75) Inventor: Nicholas James Midgley, Waterlooville (GB)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 10/526,810

(22) PCT Filed: Aug. 29, 2003

(86) PCT No.: PCT/GB03/03745
§ 371 (c)(1),
(2), (4) Date: Mar. 4, 2005

(87) PCT Pub. No.: WO2004/023757
PCT Pub. Date: Mar. 18, 2004

(65) Prior Publication Data
US 2006/0168224 A1   Jul. 27, 2006

(30) Foreign Application Priority Data
Sep. 7, 2002 (GB) .................................. 0220846.0

(51) Int. Cl.
*G06F 15/173* (2006.01)
*G06F 15/16* (2006.01)
(52) U.S. Cl. ........................................ 709/226; 709/230
(58) Field of Classification Search .................. 709/201, 709/226, 232, 234, 238; 713/150, 168; 718/1, 718/105
See application file for complete search history.

(56) References Cited

U.S. PATENT DOCUMENTS
5,951,694 A * 9/1999 Choquier et al. ............... 714/15
6,230,183 B1 * 5/2001 Yocom et al. .................. 718/105
(Continued)

FOREIGN PATENT DOCUMENTS
JP   2002-132742   5/2002
(Continued)

OTHER PUBLICATIONS

Yoshimura et al., "A Datacenter Platform for Improving Response on Web Access Peaks", Technical Report of the Institute of Electronics, Information and Communication Engineers (IEICE), Oct. 4, 2001, vol. 101, No. 339, pp. 33-40 (Abstract Only).

(Continued)

*Primary Examiner* — Jeffrey Pwu
*Assistant Examiner* — Shaq Taha
(74) *Attorney, Agent, or Firm* — Arthur J. Samodovitz

(57) ABSTRACT

The present invention relates to a method and system for the remote and dynamic configuration of a webserver to facilitate capacity on demand. The present invention provides a solution to the problem of the management and administration of one or more servers within an environment such as a server farm with regards to the rigid infrastructure and architecture of the servers due to the definition of roles the servers play in relation to the data the servers are publishing. A solution is provided in the form of autonomic modular computing components to allow a server to process a URL and the server to associate it with a remote data source without the need for a restart or manual intervention of the server and to allow the introduction of new services and or hardware resources by collating and analyzing performance data collected from the server to determine if the server is over or under utilized.

15 Claims, 7 Drawing Sheets

U.S. PATENT DOCUMENTS

| | | | |
|---|---|---|---|
| 6,230,200 B1 * | 5/2001 | Forecast et al. | 709/226 |
| 6,564,216 B2 * | 5/2003 | Waters | 707/10 |
| 6,571,288 B1 * | 5/2003 | Sarukkai | 709/226 |
| 6,785,827 B2 * | 8/2004 | Layton et al. | 713/300 |
| 6,801,949 B1 * | 10/2004 | Bruck et al. | 709/232 |
| 6,859,798 B1 * | 2/2005 | Bedell et al. | 706/45 |
| 6,859,830 B1 * | 2/2005 | Ronneburg et al. | 709/224 |
| 6,886,035 B2 * | 4/2005 | Wolff | 709/219 |
| 7,080,378 B1 * | 7/2006 | Noland et al. | 718/104 |
| 7,177,901 B1 * | 2/2007 | Dutta | 709/203 |
| 7,570,587 B1 * | 8/2009 | Wilson et al. | 370/230 |
| 2002/0002611 A1 | 1/2002 | Vange | |
| 2002/0032768 A1 * | 3/2002 | Voskuil | 709/224 |
| 2002/0032787 A1 * | 3/2002 | Overton et al. | 709/230 |
| 2003/0014507 A1 * | 1/2003 | Bertram et al. | 709/223 |
| 2003/0051187 A1 * | 3/2003 | Mashayekhi et al. | 714/4 |
| 2003/0084159 A1 | 5/2003 | Blewett | |
| 2003/0126202 A1 * | 7/2003 | Watt | 709/203 |
| 2004/0019680 A1 * | 1/2004 | Chao et al. | 709/226 |
| 2004/0181794 A1 * | 9/2004 | Coleman et al. | 718/104 |
| 2005/0228856 A1 * | 10/2005 | Swildens et al. | 709/200 |
| 2010/0005175 A1 * | 1/2010 | Swildens et al. | 709/226 |

FOREIGN PATENT DOCUMENTS

| | | |
|---|---|---|
| WO | 0062502 A2 | 10/2000 |
| WO | 0062502 A3 | 10/2000 |

OTHER PUBLICATIONS

"Summary of JP Examiner Cited Art".

* cited by examiner

140 Management server

US 7,930,397 B2

REMOTE DYNAMIC CONFIGURATION OF A WEB SERVER TO FACILITATE CAPACITY ON DEMAND

FIELD OF THE INVENTION

The invention relates to the field of network services and in particular to the remote and dynamic configuration of a server to facilitate capacity on demand.

BACKGROUND OF THE INVENTION

Many companies offer hosting services to provide customers with a secure, robust and flexible infrastructure in which to host a variety of applications for example web applications such as on-line banking, on-line shopping, information services and hosting service such as 'pay for used capacity' which, enable a customer to only pay for the processing power that they use and allows the customer to deploy the most up-to-date equipment in a cost effective manner. Hosting services provide many businesses with an alternative solution to building and running their technology infrastructure in-house by tapping into computer systems in other company's data centers to provide the management of software applications and hardware resources such as servers. The management and administration of these servers and services provide a tremendous challenge to many hosting companies, as a key problem with the management and administration of the servers within an environment such as a server farm is the rigid infrastructure and architecture of the servers due to the definition of roles the servers play in relation to the data the servers are publishing.

The rigid allocation of a resource to for example, a web server which supports a particular customer's product can result in an under utilized yet expensive web server resource not being used to it's full capability, while other web servers supporting other products are stretched to the point of breaking. Further today's current state of the art web server software is complex and flexible and can be configured and extended through Application Protocol Interfaces (API) to facilitate powerful processing beyond the standard serving of basic Hypertext Markup Language (HTML) pages. However current deployment practices and technologies require that the web servers are configured manually using either configuration files or binary registries and thus remain static during their operation, handling requests for a specific website or websites. When an additional or a different resource for a particular HTML page or a different web site URL needs publishing or a need arises for a new server to be added to, or removed from a server pool, the servers must be restarted for any change to take effect. This requires a tremendous administration effort on the part of the server farm administrator because it takes a considerable amount of time to manually configure a server and it is not always convenient to shut down a server and restart the server to allow for any changes to take effect as this can cause loss of service for a period of time.

US patent application publication US 2002/0002602 (2602) describes a system for serving web pages to a client in response to a client request specifying a resource that aims to serve a web page in a coordinated fashion from multiple cooperating web servers and maintaining a reliable connection so that the server and clients remain synchronized and information is not lost. In order for the above to take place such that a web server processes a URL and associates the URL with a data source, the web server will require manual intervention and the web server will have to be shut down and restarted for the changes to take effect.

DISCLOSURE OF THE INVENTION

In accordance with the present invention there is now provided a method for the remote and dynamic configuration of a server to facilitate capacity on demand comprising the steps of: (a) a client device requesting a resource from a first server in a communications network; (b) the first server receiving the request for the resource from the client device; (c) the first server routing the client request for the resource to a dynamic content module, the dynamic content module identifying an available third server from which the requested resource can be served and routing the requested resource to the client device; (d) collating performance data from the first and third server and the first server reporting the performance data to a second server; (e) a second server analysing the performance data collated in step (d) to determine performance capabilities of the first and the third server and identifying if the first or the third server has reached a predetermined threshold; and (f) the second server adjusting the allocation of the first server or the third server in response to step (e) and issuing a configuration update instruction for the first server or the third server to a dynamic configuration module of the first server and determining if a resource update is successful.

The present invention advantageously allows for the optimisation of a servers performance such that a server can be allocated or deallocated from a server pool depending on the server's performance for example if a server is stretched to capacity or equally if a server is under utilised. Further using modular autonomic computing components the system is able to configure and reconfigure itself under varying and unpredictable conditions. Further the method allows for making a change to a hardware resource or a data resource without the need for the server to be restarted as with other prior art systems.

Preferably the invention provides for the dynamic content module requesting a connection configuration file for the third server from the dynamic configuration module. This allows for the first server to determine which data source server has the resource requested by the client.

Preferably the invention provides for the adjusting of the allocation or deallocation of one or both the first server and the third server from a free server pool or to a free server resource pool. The present invention can therefore monitor a servers performance and either add an additional resource or de-allocate a resource depending on the work load of the server.

Preferably the invention provides for the requested resource being decoupled from the first server allowing the introduction of a new service or the removal of a redundant service.

Viewed from another aspect the present invention provides a system for the remote and dynamic configuration of a server to facilitate capacity on demand, the system comprising a client device for requesting and receiving a resource in a communications network, the system further comprising: a first server, the first server comprising a dynamic content module, a dynamic configuration module and a reporting module; means for routing the client request for the resource to the dynamic content module; means for the dynamic content module identifying a third server from which the requested resource can be served and means for retrieving a connection configuration file associated with the third server stored in the dynamic configuration module; means for the reporting module collating performance data from the first server and the third server and means for routing the performance data to a second server;
a second server comprising an analyser module, a resource allocation module and a resource update module, the second server sending the performance data to the analyser module; means for the analyser module determining the performance capabilities of the first server and the third server and means for identifying if the first server and third server has reached a predetermined threshold; means for the resource allocation module adjusting the allocation of one or both the first server and the third server in response to the identifying means; means for the resource update module issuing an configuration update instruction for one or both the first server and the third server to the dynamic configuration module of the first server and means for determining if a resource update is successful; and a third server comprising one or more resources and means for the third server to serve a requested resource to the first server.

A another advantage is that an HTTP URL can be processed by a server and associated with a remote data source without the need for the server to be restarted or requiring manual intervention. A further advantage of the present invention is the secure and centralised administration for the dynamic plug and play of data sources and hardware resources such that a web site can be served 'on the fly'. Another advantage of the present invention is for the provision of multiple protocol support for other mechanisms such as FTP, XML, SOAP and file sharing.

A computer program product comprising computer program code stored on a computer readable storage medium, which when executed on a data processing system, instructs the data processing system to carry out the following method: A method for the remote and dynamic configuration of a server to facilitate capacity on demand comprising the steps of:
(a) a client device requesting a resource from a first server in a communications network;
(b) the first server receiving the request for the resource from the client device;
(c) the first server routing the client request for the resource to a dynamic content module, the dynamic content module identifying an available third server from which the requested resource can be served and routing the requested resource to the client device;
(d) collating performance data from the first and third server and the first server reporting the performance data to a second server;
(e) a second server analysing the performance data collated in step (d) to determine performance capabilities of the first and the third server and identifying if the first or the third server has reached a predetermined threshold; and
(f) the second server adjusting the allocation of the first server or the third server in response to step (e) and issuing a configuration update instruction for the first server or the third server to a dynamic configuration module of the first server and determining if a resource update is successful.

BRIEF DESCRIPTION OF THE DRAWINGS

The invention will now be described by way of example only, with reference to the accompanying drawings, in which.

DETAILED DESCRIPTION OF THE PREFERRED EMBODIMENTS OF THE INVENTION

Figure 1:
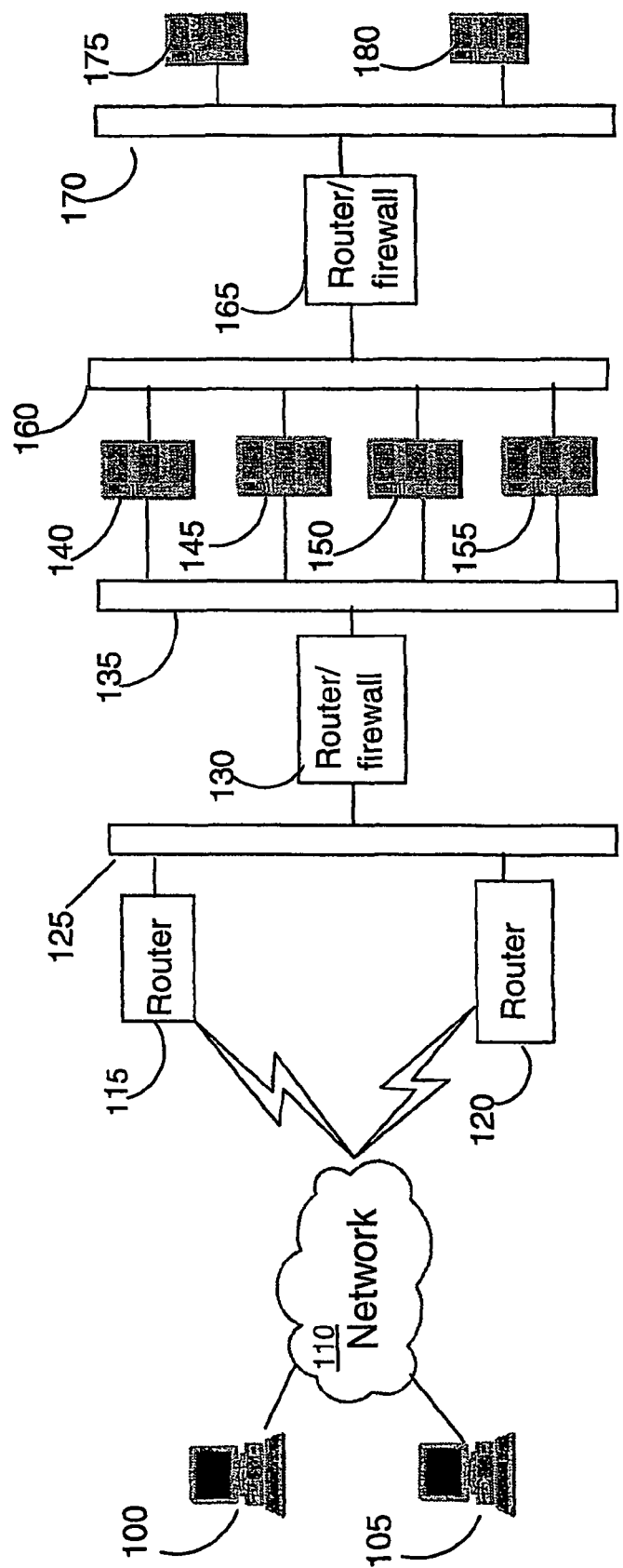
FIG. 1 illustrates a server farm in which the present invention may be implemented in accordance with a preferred embodiment of the present invention.

FIG. 1 illustrates a server farm in which the present invention may be implemented. The server farm includes a plurality of client devices 100 and 105 which are connected to a network such as the Internet 110. The client devices 100 and 105 perform transactions by sending and receiving requests for a resource over the network 110. Routers 115 and 120 provide a connection between the network 110 and the local area network (LAN) 125 which could be a high speed Ethernet network or any other suitable transmission medium or topology. The routers 115 and 120 receive an incoming request and forward the request over a network 135 to a router/firewall 130 which filters the request to a server 145 to 155. The present invention embodies a management server 140 for the central control point for servers 145 to 155. Management server 140 includes a CPU 231, operating system 232, RAM 233 and storage 234, Server 145 includes a CPU 331, operating system 332, RAM 333, and storage 334. The servers 140 to 155 may implement one or more server technologies including, for example UNIX which is a registered trademark of The Open Group in the United States and other countries, Novell which is a registered trademark of Novell Inc in the United States and other countries, or Windows NT which is a registered trademark of Microsoft Corporation in the United States and other countries or both, and/or a peer to peer networking arrangement. Although the present invention has been described with reference to a server farm, the present invention could equally be applicable to pervasive computing environments as well as other server networking arrangements.

Application data is stored in a data store in one or more data source servers 175 and 180 which are separate from the servers 140 to 155. A request is sent from any one of the servers 145 to 155 across a network 160. The request is received by a router/firewall 165 and routed over a further network 170 to the appropriate data source server 175 and 180 storing the resource that was requested by one or more client devices 100 and 105.

Figure 2:
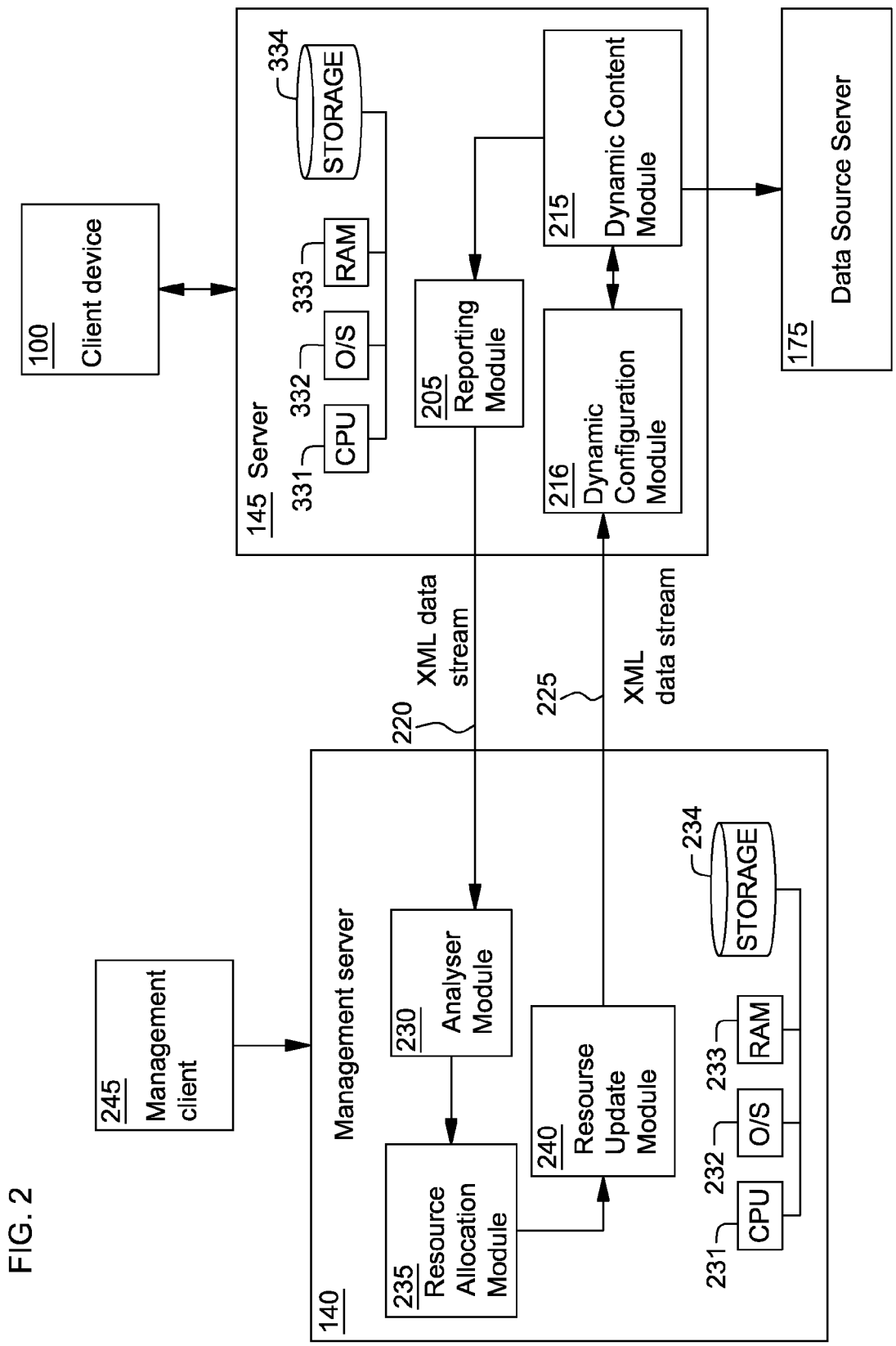
FIG. 2 illustrates a block diagram detailing an overview of the components of the system in accordance with a preferred embodiment of the present invention.

Referring to FIG. 2, a schematic view of the system is shown. The system comprises modular autonomic computing components to provide self diagnostic capabilities to detect performance issues with servers 145 to 155. Further by using modular components the system is able to provide the 'plug and play' of data sources for the easy introduction of new services.

The system comprises a server 145 with a reporting module 205 for collating performance and request data from each server 145 to 155 in an allocated server pool; a dynamic content module 215 which routes the request for a resource through the most appropriate interface to access a requested resource either using the native data access capability of the server 145 to 155 or by establishing and managing the connection to a remote server itself; a dynamic configuration module 216 for the update, processing and storing of a configuration file for each server in the allocated server pool and a client device 100 for requesting a resource from the server. The configuration file is used to hold the configuration settings for a particular server 145 to 155 for example a registration key, port settings, an installation path, authentication settings, user settings, SMPT settings, connection settings, web browser settings and log in settings.

The system further comprises a management server 140 for providing a central control point for all servers in an available server pool; an analyser module 230 for analysing the performance and request data from the reporting module 205; a resource allocation module 235 to determine whether there is a free resource in the free server resource pool to be added to the pool of allocated servers or if necessary to deallocate a server and place it back in the free server resource pool; a resource update module 240 for determining whether a resource has been successfully allocated or deallocated to or from the available resource pool and a management client 245 for the entry of manual configuration tasks into the system. The management client 245 can receive administration requests from a server administrator. The management client functions as a graphical user interface and provides greater flexibility in terms of providing connectivity to the management server for example providing connectivity remotely in another site via the Internet using a standard HTTP connection between the servers 145 to 155 and the management server 140. To enable only authorised administrators to make configuration changes, an interface may be provided to a security directory for handling authentication and entitlement requests (not shown in the figures).

Data streams 220 and 225 are sent to and from the server 145 to 155 and the management server 140 using an Extensible Markup Language (XML) as the transport mechanism 220 and 225 over an HTTP session. XML is the universal format for structured documents and data on the Web. XML uses tags similar to HTML, and allows data to be structured in a manner that is understood by many people. Further information on XML can be found at the World Wide Web Consortium.

The client device 100 sends a request for a specific resource to the server 145. One such request that may be received by a server 145 to 150 is a HTTP URL for example http://www.ibm.com requesting an HTML page. To allow the server to translate the HTTP URL, the server will use a Domain Name Service (DNS) which translates Internet domain names to network addresses such as 129.42.19.99. The resource could be a standard HTML page or an .exe file. The server 145 receives the request for the resource from the client device 100 and 105 and the request is sent to the dynamic content module 215.

Although FIG. 2 illustrates a management server 140 and a server 145, it should be appreciated that the system may comprise a plurality of servers 145 to 155 as shown in FIG. 1, each server containing the modules as shown in FIG. 2.

Figure 3:
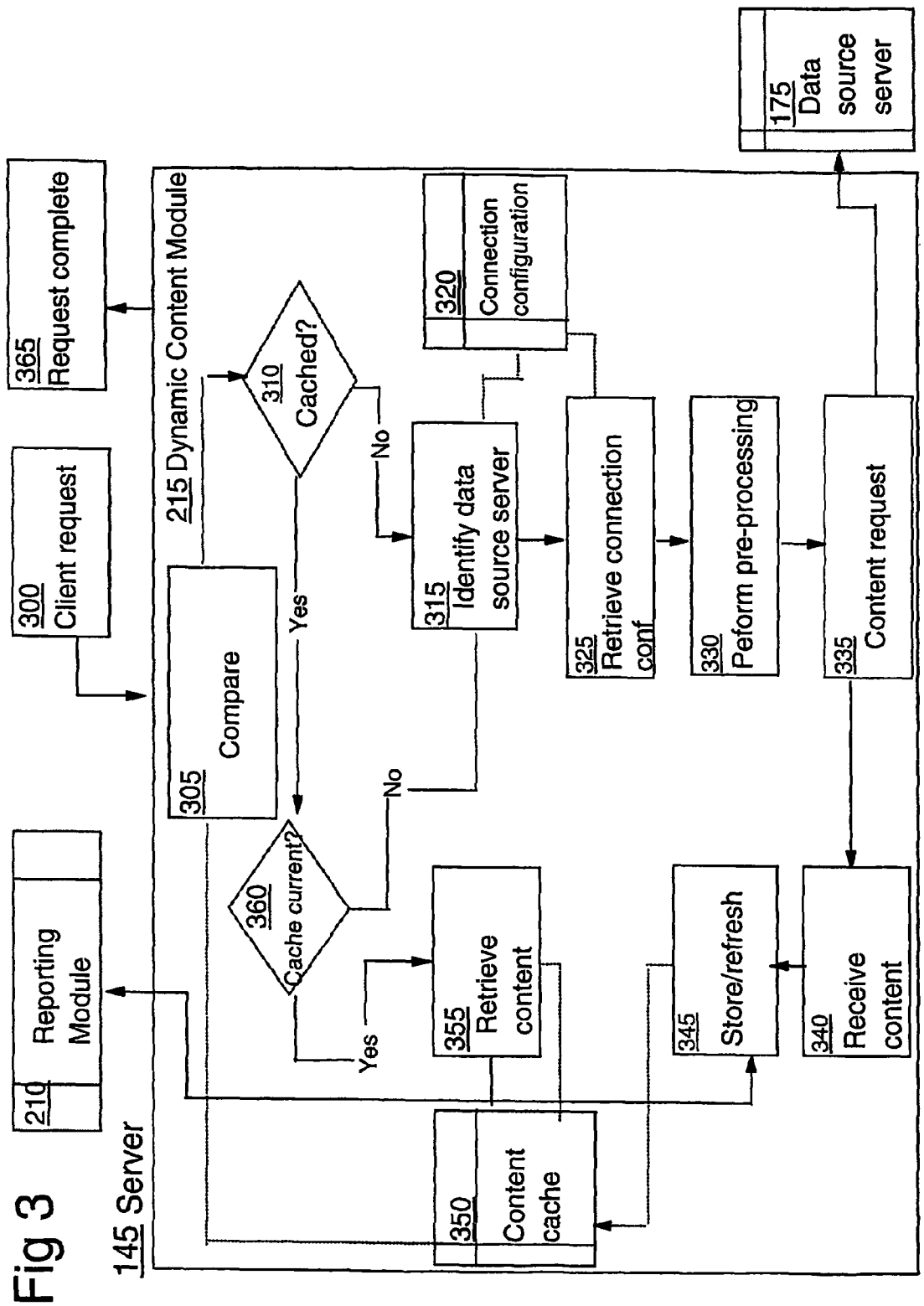
FIG. 3 illustrates a flowchart detailing the function of the dynamic content module of the web server of FIG. 2 in accordance with a preferred embodiment of the present invention.

The operation of the dynamic content module 215 will now be explained with reference to FIG. 3. It should be noted that the dotted line in FIG. 3 represents data flow and the solid single line represents control flow. The dynamic content module 215 receives the request for a resource from the client device at step 300 and compares the content stored on the server 145 with the requested resource at step 305. For example if a client requested a resource from www.ibm.com/news/today.html, the dynamic content module compares the today.html page stored on the server with the today.html page stored on a source server to determine if the today.html page has been updated therefore, sending the client device the most up to date today.html page. At step 310 the server determines whether the content has been cached and if the cached content is current and up to date at step 360. If the cache is current control flows to step 355 and the requested resource is retrieved from the content cache store 350, equally if the content is not cached, the server which contains the requested resource is identified at step 315. Further at step 355 information concerning the server's 145 activities is sent to the reporting module 205. The information can include data such as the number of requests for each resource such as a product, the time it takes the server to respond or the type of service requested such as HTTP or File Transfer Protocol (FTP).

To enable the server 145 to identify the data source server 175 the server retrieves the connection configuration file for the source server at step 325 from a connection configuration store 320. Preprocessing is performed on the content request at step 330. At step 335 a request is issued to the data source server 175 and at step 340 the server 145 receives the content as requested by the client device 300 from the source server. The retrieved content is either stored in the content cache data store 350 or the existing content is refreshed with the retrieved content at step 345 and stored in the content cache data store 350.

Figure 4:
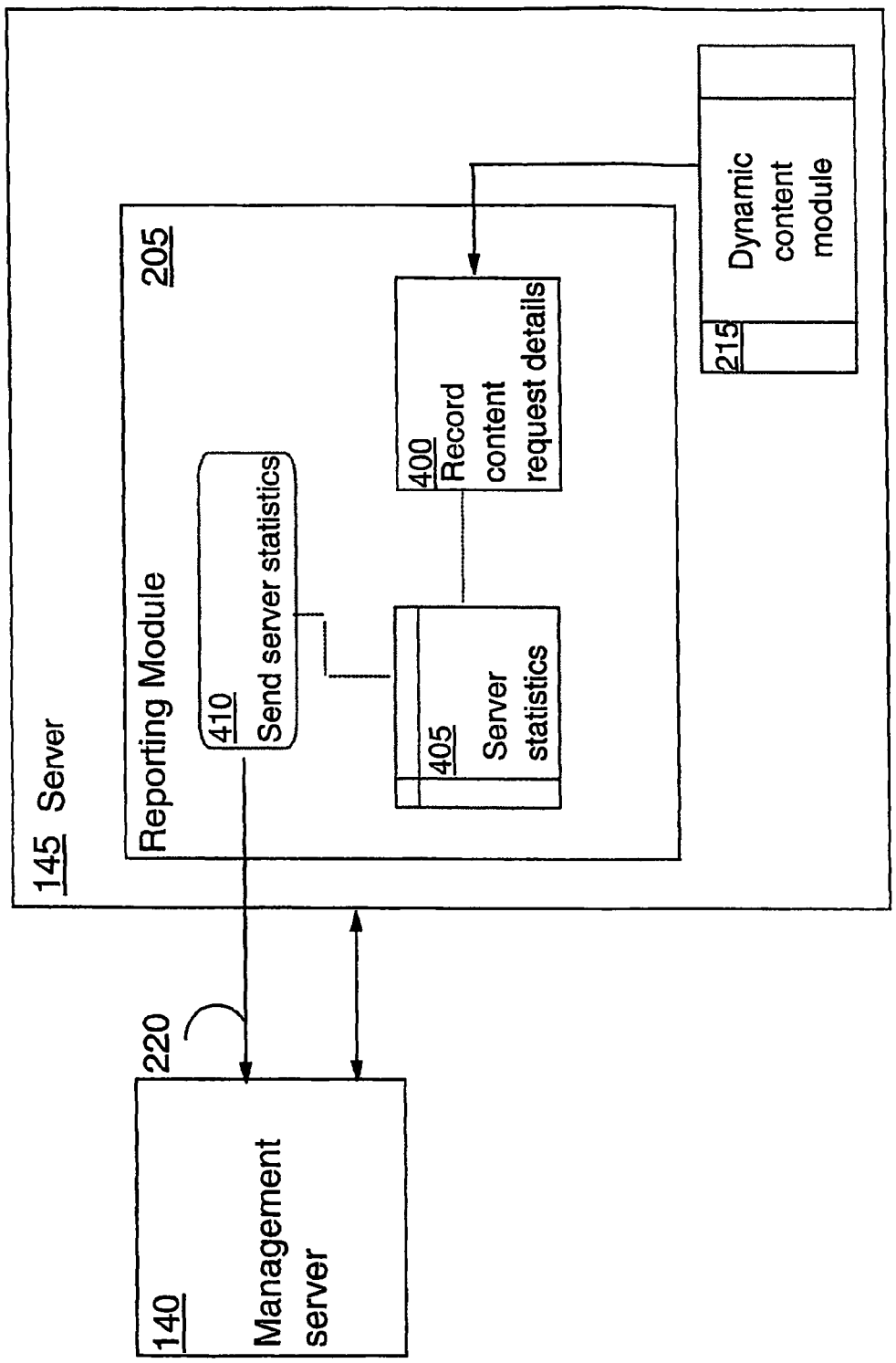
FIG. 4 illustrates a flowchart detailing the function of the reporting module of the web server of FIG. 2 in accordance with a preferred embodiment of the present invention.

Referring back to step 355, information regarding the resource requested from the client device 100 at step 300 along with performance information is sent to the reporting module 210. With reference to FIG. 4 the reporting module 205 receives the content information from the dynamic content module 215 and records the information at step 400. These details are stored in a server statistics data store at step 405 and the server statistics (response times, number of pages requested, how many times, what pages, which server, server config details and performance data) associated with each server 145 to 155 are sent to the management server 140 at step 410 via an XML data streams 220.

Figure 5:
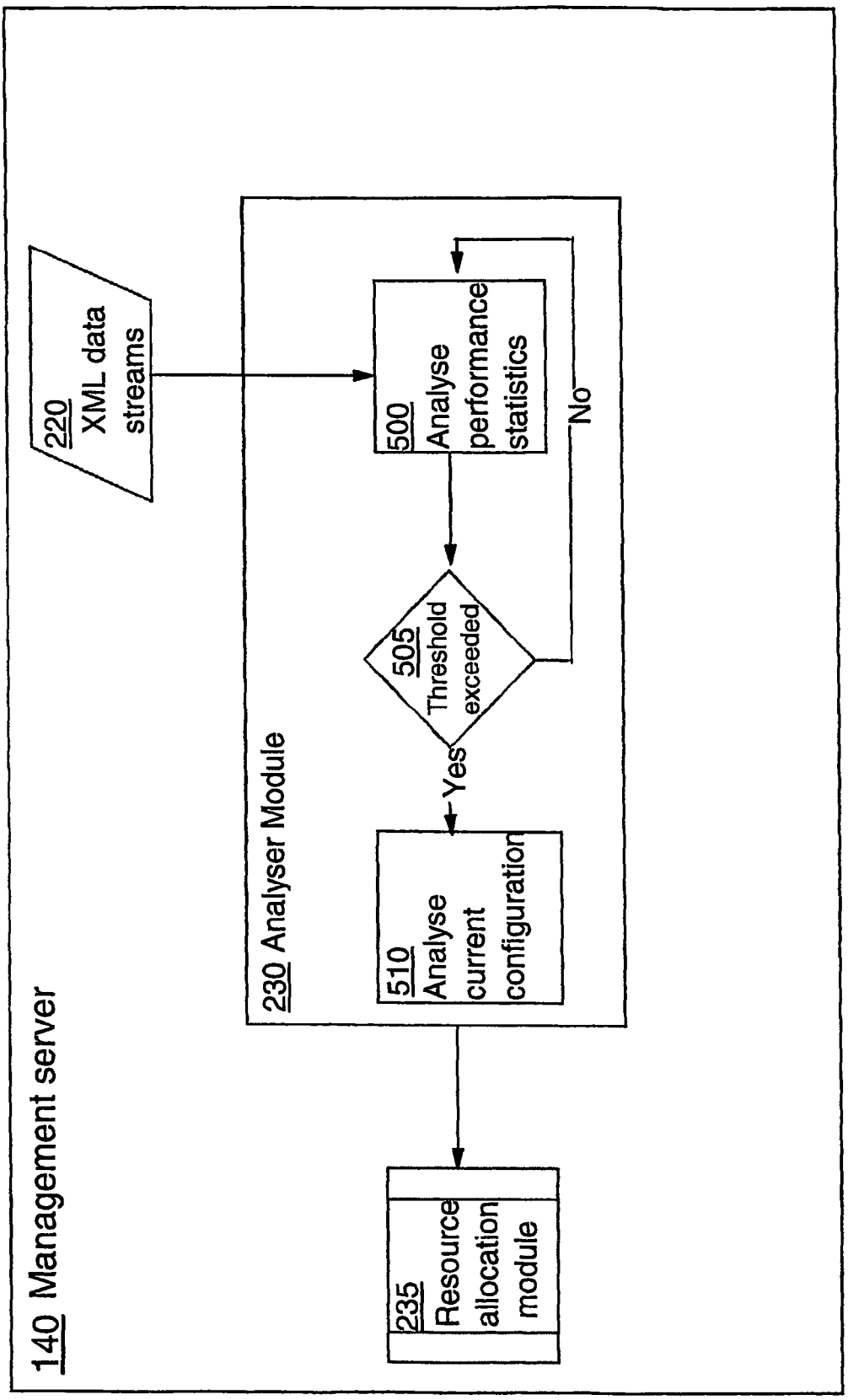
FIG. 5 illustrates a flowchart detailing the function of the analyser module of the management server of FIG. 2 in accordance with a preferred embodiment of the present invention.

Referring to FIG. 5, the analyser module 230 of the management server 140 receives the server statistics in the XML data streams 220 and at step 500 the analyser module 230 analyses the server statistics to determine whether the server 145 to 155 has reached a predetermined threshold at step 505, if the server's performance has not reached the predetermined threshold control flows back to step 500, else control flows to step 510 and the analyser module 230 analyses the server's current configuration settings and the server's configuration settings are sent to the resource allocation module 235.

Figure 6:
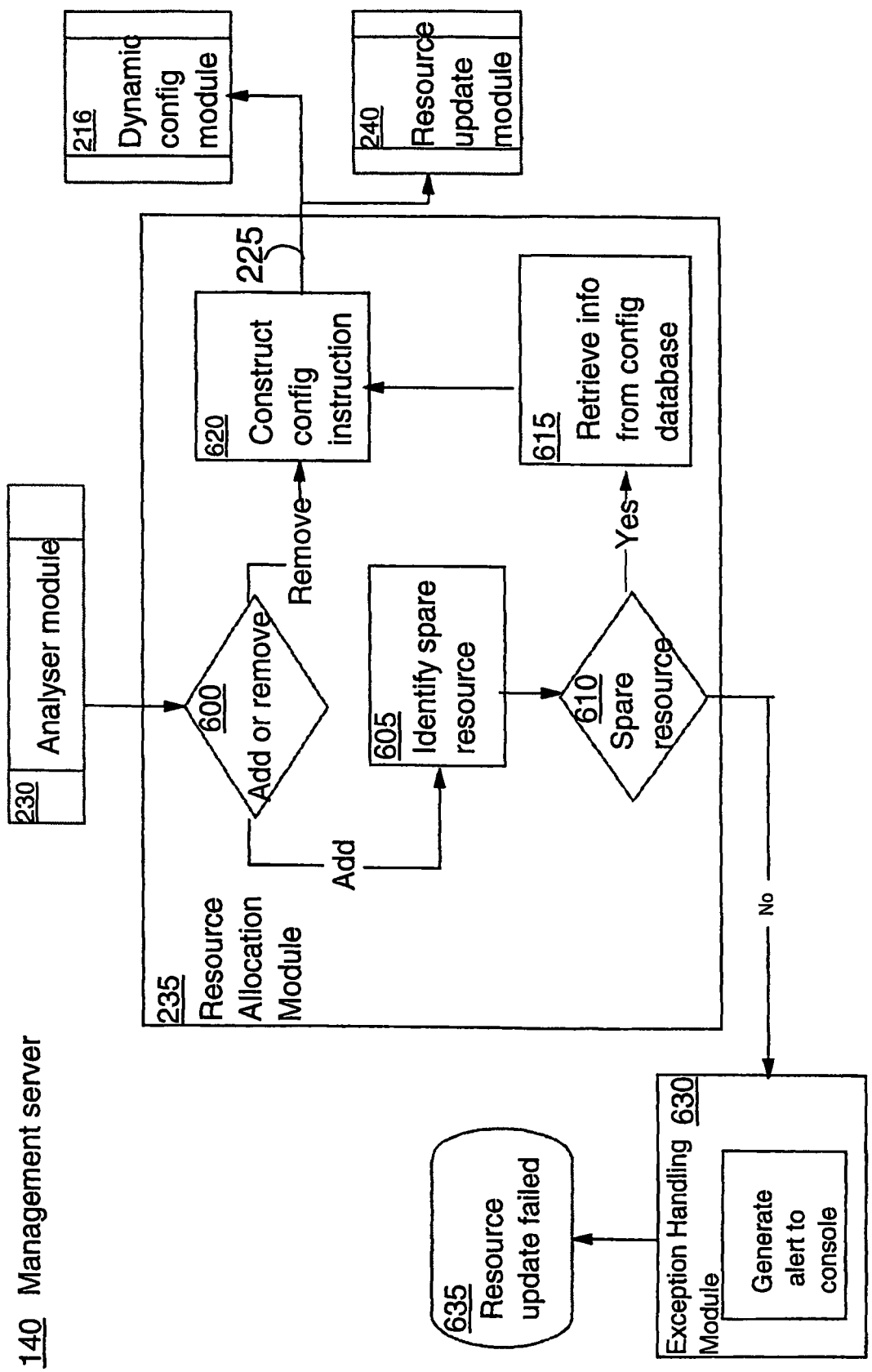
FIG. 6 illustrates a flowchart detailing the function of the resource allocation module of the management server of FIG. 2 in accordance with a preferred embodiment of the present invention.

Referring to FIG. 6 at step 600, the resource allocation module 235 determines whether a new server should be added to a current pool of allocated severs 145 to 155 if the performance threshold has been exceeded or if a server should be removed from the current pool of allocated servers and returned to the free resource pool. If the analyser module 230 determines that an additional server is to be added, control flows to step 605 and the resource allocation module identifies whether there exists a spare resource at step 610. A spare resource could be for example an additional server or equally some other hardware resource. If a spare resource can not be located control flows to step 630 and at step 635 an exception error is created and displayed in the management console 245 to alert a technician that the resource update has failed at step 635. Referring back to step 610 if a spare resource has been located control flows to step 615 and a new server is selected and information regarding the server's configuration settings file is requested from the configuration database 615 of the particular server 140 to 155. At step 620 once the configuration setting file has been received, the configuration setting file is updated with the current instruction for the selected server and sent to the resource update module 240 and the dynamic configuration module 216 via XML data streams 225.

Figure 7:
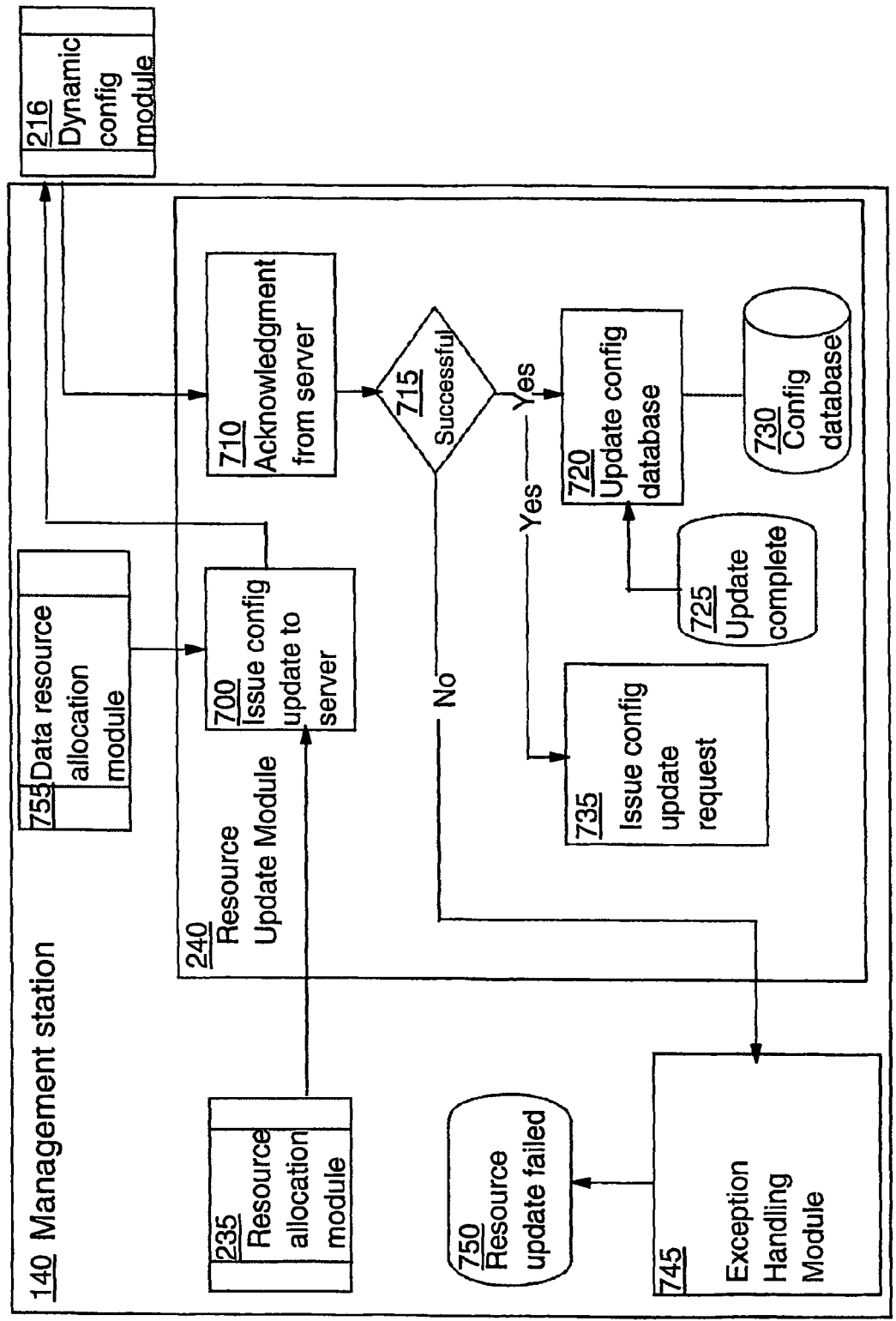
FIG. 7 illustrates a flowchart detailing the function of resource update module of the management server of FIG. 2 in accordance with a preferred embodiment of the present invention.

Referring to FIG. 7, at step 700 the configuration update information is issued to the dynamic configuration module 216 of the server 145 via XML data streams 225. The resource update module 240 waits for acknowledgment from the server 145 at step 710. If a configuration update is successful at step 715 control flows to step 720 and the configuration database 730 is updated. Referring back to step 720 if the acknowledgment from the server 145 is successful control also passes to step 735 and a configuration update request for a load balancing infrastructure is requested. Equally if at step 720 the update is not successful control flows to step 745 and an exception handling alert is generated and the resource update is deemed to have failed at step 750.

The invention claimed is:

1. A method for allocating an additional real application server to an existing pool of real application servers, the pool including a first real application server having an application installed therein and communicating with a real data-source server to obtain application data from the data-source server, the additional application server having the application installed therein, the method comprising the steps of:
   a real management server for the pool receiving performance data for the first real application server and performance data for the real data-source server;
   the real management server, based on the performance data for the first real application server and the performance data for the real data-source server, automatically determining that the first real application server is functional but has reached a predetermined upper level of utilization, the performance data for the real data-source server indicating an amount of utilization of the real data-source server in providing application data to one or more of the real application servers in the pool, and in response to the determination that the first real application server is functional but has reached a predetermined upper level of utilization,
   the real management server automatically identifying the additional real application server as having the application but not currently allocated to the pool, and
   the real management server automatically selecting the real data-source server to provide application data to the additional real application server and automatically sending connection settings for the real data-source server to the additional real application server to configure the additional real application server to send subsequent requests for application data to the real data-source server.

2. The method set forth in claim 1 wherein:
   in response to the step of the real management server automatically determining that the first real application server is functional but has reached a predetermined upper level of utilization, further comprising the step of the real management server automatically sending to the additional real application server, port settings for the real data-source server to communicate with the real data-source server to obtain application data from the real data-source server.

3. The method set forth in claim 1 further comprising the subsequent steps of:
   based on subsequent performance data of the first real application server, the real management server determining that the first real application server is functional but under utilized such that the first real application server is no longer needed in the pool, and in response, the real management server automatically de-allocating the first real application server from the pool.

4. The method set forth in claim 1 wherein a multiplicity of copies of the application are installed in a respective multiplicity of the real application servers in the pool.

5. The method set forth in claim 1 wherein:
   in response to the step of the real management server automatically determining that the first real application server is functional but has reached a predetermined upper level of utilization, further comprising the step of the real management server automatically sending to the additional real application server a description of an installation path for the real data-source server to support communication with the additional real application server.

6. A real management server for allocating an additional real application server to an existing pool of real application servers, the pool including a first real application server having an application installed therein and communicating with a real data-source server to obtain application data from the data-source server, the additional application server having the application installed therein, the real management server comprising:
   a CPU, a computer readable memory and a computer readable storage media;
   first program instructions to receive performance data for the first real application server and performance data for the real data-source server;
   second program instructions, based on the performance data for the first real application server and the performance data for the real data-source server, to determine that the first real application server is functional but has reached a predetermined upper level of utilization, the performance data for the real data-source server indicating an amount of utilization of the real data-source server in providing application data to one or more of the real application servers in the pool, and in response to the determination that the first real application server is functional but has reached a predetermined upper level of utilization,
   the second program instructions identify the additional real application server as having the application but not currently allocated to the pool, and
   the second program instructions select the real data-source server to provide application data to the additional real application server and automatically send connection settings for the real data-source server to the additional real application server to configure the additional real application server to send subsequent requests for application data to the real data-source server; and wherein
   the first and second program instructions are stored on the computer readable storage media for execution by the CPU via the computer readable memory.

7. The real management server set forth in claim 6 wherein:
   in response to the determination that the first real application server is functional but has reached a predetermined upper level of utilization, the second program instructions automatically send to the additional real application server, port settings for the real data-source server to communicate with the real data-source server to obtain application data from the real data-source server.

8. The real management server set forth in claim 6 wherein: the second program instructions, based on subsequent performance data of the first real application server, determine that the first real application server is functional but under utilized such that the first real application server is no longer needed in the pool, and in response, the second program instructions automatically de-allocate the first real application server from the pool.

9. The real management server set forth in claim 6 wherein a multiplicity of copies of the application are installed in a respective multiplicity of the real application servers in the pool.

10. The real management server set forth in claim 6 wherein:
the second program instructions, responsive to the determination that the first real application server is functional but has reached a predetermined upper level of utilization, automatically send to the additional real application server a description of an installation path for the real data-source server to support communication with the additional real application server.

11. A computer program product for execution in a real management server for allocating an additional real application server to an existing pool of real application servers, the pool including a first real application server having an application installed therein and communicating with a real data-source server to obtain application data from the data-source server, the additional application server having the application installed therein, the computer program product comprising:
a computer readable storage media;
first program instructions to receive performance data for the first real application server and performance data for the real data-source server;
second program instructions, based on the performance data for the first real application server and the performance data for the real data-source server, to determine that the first real application server is functional but has reached a predetermined upper level of utilization, the performance data for the real data-source server indicating an amount of utilization of the real data-source server in providing application data to one or more of the real application servers in the pool, and in response to the determination that the first real application server is functional but has reached a predetermined upper level of utilization,
the second program instructions identify the additional real application server as having the application but not currently allocated to the pool, and
the second program instructions select the real data-source server to provide application data to the additional real application server and automatically send connection settings for the real data-source server to the additional real application server to configure the additional real application server to send subsequent requests for application data to the real data-source server; and wherein
the first and second program instructions are stored on the computer readable storage media.

12. The computer program product set forth in claim 11 wherein:
in response to the determination that the first real application server is functional but has reached a predetermined upper level of utilization, the second program instructions automatically send to the additional real application server, port settings for the real data-source server to communicate with the real data-source server to obtain application data from the real data-source server.

13. The computer program product set forth in claim 11 wherein:
the second program instructions, based on subsequent performance data of the first real application server, determine that the first real application server is functional but under utilized such that the first real application server is no longer needed in the pool, and in response, the second program instructions automatically de-allocate the first real application server from the pool.

14. The computer program product set forth in claim 11 wherein a multiplicity of copies of the application are installed in a respective multiplicity of the real application servers in the pool.

15. The computer program product set forth in claim 11 wherein:
the second program instructions, responsive to the determination that the first real application server is functional but has reached a predetermined upper level of utilization, automatically send to the additional real application server a description of an installation path for the real data-source server to support communication with the additional real application server.

\* \* \* \* \*